United States Patent [19]

Schapira et al.

[11] Patent Number: 4,666,613

[45] Date of Patent: May 19, 1987

[54] PROCESS AND AGENTS FOR CONTROLLING THE SWELLING OF CLAYS IN THE PRESENCE OF SEA-WATER AND CLAY-BASED MUDS

[75] Inventors: Joseph Schapira, Paris; Jacques Vincent, Mareil Marly; Daniel Chaillou, Asnieres; Jacques Schild, Gennevilliers, all of France

[73] Assignee: Compagnie Francaise de Produits Industriels, France

[21] Appl. No.: 600,811

[22] Filed: Apr. 16, 1984

[30] Foreign Application Priority Data

Apr. 18, 1983 [FR] France .................................. 83 06309

[51] Int. Cl.$^4$ .................................................. C09K 7/02
[52] U.S. Cl. ................................... 252/8.511; 252/8.51
[58] Field of Search ............. 252/8.5 A, 8.5 C, 8.55 R

[56] References Cited

U.S. PATENT DOCUMENTS

| | | | |
|---|---|---|---|
| 2,280,995 | 4/1942 | Booth | 252/8.5 |
| 2,761,843 | 9/1956 | Brown | 252/8.55 |
| 2,873,251 | 2/1959 | Jones | 252/8.5 |
| 3,081,260 | 3/1963 | Park | 252/8.5 |
| 3,086,937 | 4/1963 | Fischer | 252/8.5 |
| 3,107,739 | 10/1963 | Matthews | 252/8.5 |
| 3,360,461 | 12/1967 | Anderson et al. | 252/8.5 |
| 3,372,112 | 3/1968 | Parker | 252/8.5 |
| 4,486,340 | 12/1984 | Glass | 252/8.5 X |

OTHER PUBLICATIONS

Rogers, *Composition and Properties of Oil Well Drilling Fluids*, pub. 1963, third edition, pp. 466-471.
Gray et al, *Composition and Properties of Oil Well Drilling Fluids*, pub. 1980, fourth edition, p. 542.

*Primary Examiner*—Herbert B. Guynn

*Attorney, Agent, or Firm*—Larson & Taylor

[57] ABSTRACT

Process for controlling the swelling of clays of bentonite type clays in the presence of salt-water in the preparation of drilling fluids, comprising the steps of
selecting at least one compound from the group of salifiable active compounds comprising
cyanamide, hexamethylenetetramine, guanidine and aminoguanidine,
those having the formula:

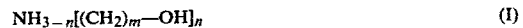

$$NH_{3-n}[(CH_2)_m-OH]_n \qquad (I)$$

in which m is equal to 2, 3 or 4 and n to 1, 2 or 3 with the possibility, when m is equal to 3 or 4, of having a branched chain,
those having the formula:

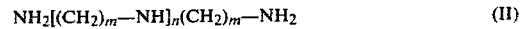

$$NH_2[(CH_2)_m-NH]_n(CH_2)_m-NH_2 \qquad (II)$$

in which m is equal to 2, 3, 4, 5 or 6 and n is a whole number from 0 to 10,
derivatives of formula (I) and (II),
preparing a concentrated mixture, also called premix, of bentonite and soft water,
diluting the premix with salt water up to the concentration desired for the drilling fluid,
introducing in the premix or in the soft water used for its preparation, or in the premix diluted with salt water, or in the salt water used for diluting the premix, an effective amount of the said a least one active compound without satisfying the same, or
introducing the at least one active compound after salification either in the salt water used for dilution of the premix or into the final diluted mixture or in the premix diluted with soft water.

7 Claims, No Drawings

PROCESS AND AGENTS FOR CONTROLLING THE SWELLING OF CLAYS IN THE PRESENCE OF SEA-WATER AND CLAY-BASED MUDS

BACKGROUND OF THE INVENTION

The invention relates to a process and agents for controlling the swelling of clays especially in the presence of sea-water, more particularly within the scope of the use of said clays for the constitution of drilling fluids, called in the art "drilling muds".

It relates also to clay-based muds obtained by the use of the abovesaid process and agents and constituting novel industrial products.

The use of clays for the constitution of drilling fluids which are used especially for carrying to the surface the cuttings released by the action of the drilling tool, is well-known.

These fluids are then freed from the cuttings that they have entrained, then they are re-circulated after having been "replenished" with those of their constituents which are found to be exhausted.

Clays, by their well known swelling in the presence of water, confer on these fluids a consistency of "muds", whence the expression "drilling muds", of which the viscosity must be such that the cuttings are correctly removed and are deposited as little as possible by sedimentation on standing, without however offering prohibitive resistance to the rotation of the constituent elements of the drilling tool.

Moreover, the consistency of the mud must be such that what is called "filtration" of the water which enters into its constitution, is avoided, that is to say the "migration" of this water into the geological strata traversed, which migration is manifested by an imbalance in the composition of the mud and by the deposition of a "cake" on the walls of the well bore capable of resulting, once it has reached a sufficient thickness, inconsiderable mechanical friction.

Finally, when the drill passes through geological layers based particularly on clay, the drilling fluid or mud must not cause the swelling of this clay since such swelling can result in the sticking of the clay to the drill string to the extent of preventing the continuation of drilling; the contact of the mud and of the wall must not cause the shrinking of the clay constituting the wall either, which would result in the formation of cavities, cavings and settlements in the well bore and, here again, would stop the drilling. Finally, the mud must not be the cause of a slow change in the geological layer based on clay which would create pressures strong enough to destroy, for example, the infrastructures of a well under exploitation.

The behavior of clays, which is different when they are contacted with soft water or salt water, particularly sea-water, is well known; soft water is especially used for the constitution of drilling fluids in the case of drillings on land—but then these fluids may possibly be placed in contact with salt water present in certain geological layers through the drilling passes—whereas salt water, that is to say, in practice, sea-water, is used for the constitution of muds in sea drillings of the "off-shore" type.

The principal type of clay used for the constitution of drilling fluids is that of the bentonite family.

The latter gives satisfaction as long as the water used is soft water.

Their drawback is, on the other hand, not swelling in the presence of sea-water.

For that reason, when drilling fluids are constituted with sea-water, another type of clay, i.e. attapulgite, is used which in fact swells in the presence of sea-water, but whose properties are not so good, especially as regards reduction of the filtrate, that is to say the loss of water by filtration, which must then be compensated by additives such as modified starches.

Once the technician skilled in the art has selected the clay, particularly according to the place—on ground or at sea—of the drilling, he must select a certain number of additives which are well known and on all of which it is hence unnecessary to dwell here; by means of these additives, he confers on the final drilling fluid the above-mentioned properties of viscosity, filterability, inertia with respect to the clay of clay-based geological layers traversed during the drilling and the like.

To render the mud inert with respect to the clay of the clay-based geological layers traversed during drilling, the technician skilled in the art conventionally uses various products, particularly sodium chloride, gypsum, lime, calcium chloride and the like; U.S. Pat. No. 3,086,937 proposes to improve the results recorded with these products by resorting to tetra(hydroxyalkyl)alkylene diamines; in other words, this U.S. patent describes drilling fluids containing said diamines, these fluids being, conventionally, based on attapulgite when the water used for their constitution is sea-water, based on bentonite when the water used is soft water.

This patent hence does not provide a solution to the problem posed by the impossibility of using bentonites when the water taken for the constitution of the drilling fluid is sea-water.

Now, if only from a practical point of view, the user would like to be able to use bentonites as well as attapulgite for ocean drillings.

This is the problem that Applicants have attempted to solve.

GENERAL DESCRIPTION OF THE INVENTION

Applicants have found, as a result of extensive research, that it was possible to prepare drilling fluids which, whilst being constituted from bentonite and sea-water, satisfy the exigencies of practice, by proceeding successively;

in a first or predilution step, with the preparation of a concentrated mixture or premixture, or premix, based on bentonite and soft water and, in a second step, with the dilution, up to the desired concentration, of the premix with salt water, particularly sea-water, it being understood that an effective amount of at least one of the active compounds of the group comprising:

cyanamide, dicyandiamide, hexamethylenetetramine, guanidine and aminoguanidine, compounds corresponding to the formulae:

$$NH_{3-n}[(CH_2)_m-OH]_n \qquad (I)$$

in which m is equal to 2, 3 or 4 and n to 1, 2 or 3 with the possibility, when m is equal to 3 or 4, of having a branched chain and $$NH_2[(CH_2)_m-NH]_n(CH_2)_m-NH_2 \qquad (II)$$

in which m is equal to 2, 3, 4, 5 or 6 and n is a whole number from 0 to 10, the derivatives of formula (I) in which at least one of the mobile hydrogen atoms borne by the nitrogen atom when n is equal to 1 to 2 or the oxyten atoms is substituted by a radical obtained by polycondensation of olefine oxides, preferably ethylene, propylene or butylene, the numver of olefine oxide units being from 1 to 20, preferably from 1 to 10, or by an aliphatic hydrocarbon group of $C_1$ to $C_4$, the derivatives of formula (II) in which at least one of the mobile hydrogen atoms borne by a nitrogen atom is substituted by a radical obtained by polycondensation of olefine oxides, preferably ethylene, propylene or butylene, the number of olefine oxide units being from 1 to 20, preferably from 1 to 10, or by an aliphatic hydrocarbon group of $C_1$ to $C_4$ is added;

either as such to the starting soft water or to the premix, or, preferably, in salified form to the diluting sea-water and, more preferably still, to the mixture diluted with sea-water.

The invention relates also to active compounds for the control of the swelling of clays in the manufacture of drilling fluids, the said active compounds which are salified if necessary being selected from the group comprising:

cyanamide, dicyandiamide, hexamethylenetetramine, guanidine and aminoguanidine, compounds corresponding to the formulae:

$$NH_{3-n}[(CH_2)_m-OH]_n \qquad (I)$$

in which m is equal to 2, 3 or 4 and n to 1, 2 or 3 with the possibility, when m is equal to 3 or 4, of having a branched chain and $$NH_2[(CH_2)_m-NH]_n(CH_2)_m-NH_2 \qquad (II)$$

in which m is equal to 2, 3, 4, 5 or 6 and n is a whole number from 0 to 10, the derivatives of formula (I) in which at least one of the mobile hydrogen atoms borne by the nitrogen atom or the oxygen atoms is substituted by a radical obtained by polycondensation of olefine oxides, preferably ethylene, propylene or butylene, the number of olefine oxide units being from 1 to 20, preferably from 1 to 10, or by an aliphatic hydrocarbon group of $C_1$ to $C_4$, the derivatives of formula (II) in which n=0 and in which at the most one of the mobile hydrogen atoms borne by a nitrogen atom is substituted by a radical obtained by polycondensation of olefine oxides, preferably ethylene, propylene or butylene, the number of olefine oxide units being from 1 to 20, preferably from 1 to 10, or by an aliphatic hydrocarbon group of $C_1$ to $C_4$, the derivatives of formula (II) in which n is equal to a whole number from 1 to 10 and in which at least one of the mobile hydrogen atoms borne by a nitrogen atom is substituted by a radical obtained by polycondensation of olefine oxides, preferably ethylene, propylene or butylene, the number of olefine oxide units being from 1 to 20, preferably from 1 to 10, or by an aliphatic hydrocarbon group of $C_1$ to $C_4$.

In an advantageous embodiment of the abovementioned process and control agent, the active compound possibly salified, i.e. in the form of a salt, of formula (II) is one of those of the group obtained when:

n=0 and m equal to 2, 3, 4, 5 or 6
n=1 and m equal to 2 or 3
n=2 and m=2, the mobile hydrogen atoms borne by the nitrogen atoms not being substituted.

According to another advantageous embodiment of the abovesaid process and control agent, the active compound possibly in salt form is one of those of the group comprising ethylenediamine, propylenediamine, butylenediamine, hexamethylenediamine, diethylenetriamine, dipropylenetriamine, triethylenetetramine, mono-, di- and triethanolamines, monomethyl- and monoethyl-monoethanolamines, monomethyldiethanolamine, mono-, di- and triisopropanolamines, dimethylaminopropylamine, cyanamide, aminoguanidine, guanidine, hexamethylenetetramine.

According to another advantageous embodiment of the abovesaid process and control agent, when the active compound used is in salt form, the associated anion is that of an inorganic or organic acid, selected particularly in the group of those comprising hydrochloric, sulfuric, sulfamic, phosphoric, formic and acetic acids.

According to another advantageous embodiment of the abovesaid process, the concentration of bentonite of the premix is selected in the range of about 500 to 20 g/l, preferably from 400 to 50 g/l, and the concentration of bentonite of the fluid after dilution with sea-water in the range of about 200 to 5 g/l, preferably from 100 to 10 g/l.

According to another advantageous embodiment of the abovesaid process, the effective amount of active compound is such that the proportion of active compound present in the drilling fluid after dilution is comprised in the range of about 0.05 to 10% by weight, preferably from 0.1 to 2% by weight, the said compound having been introduced in unsalified form, either in the starting soft water, or in the premix, or in salified form, either in the diluting sea-water of the premix, or in the mixture diluted with sea-water, it being understood that, in the case where the introduction is done in the starting soft water or in the premix, the proportions of active compound present at this stage are predetermined according to the subsequent dilution.

In the following, by studying the behavior of the fluids obtained according to the invention and to illustrate the abovesaid general indications, a larger number of experiments are described in which the various parameters which have just been envisaged are varied, namely especially the nature of the active compound and the time of its introduction, it being understood that it is said that:

the active compound is introduced at the "1 position" when it is introduced in the soft water used for the constitution of the premix, the active compound is introduced at the "2 position" when it is added to the premix, and that the active compound is introduced at the "3 position" when it is added to the fluid obtained by dilution of the premix.

The behavior of the fluids is illustrated by studying their rheology, this study being based on the mesurements of the viscosities of these fluids.

For this study, it is possible to resort to a BAROID viscosimeter of the "variable speed electronic rheometer no. 286 type" marketed by the N. L. Baroid Petroleum Services Company (N. L. Industries Inc., P.O. Box 1675, Houston, Tex.).

The measurements of the viscosity were carried out at ambiant temperature, at zero time and after four days.

The readings carried out at the speeds of 600, 300, 200 and 100 rpm are defined respectively by L 600, L 300, L 200 and L 100.

Knowing these measured values for the viscosity the hereinafter defined data $V_A$, $V_p$ and $Y_V$ can be calculated, which are characteristic of the rheological properties of the fluids.

Thus, by construction, the value of what is called "apparent viscosity" $V_A$, expressed in centipoises, is equal to L 600 divided by two.

The value of the "plastic viscosity" $V_p$, again in centipoises, is equal to L 600—L 300.

The value of the "plastic flow limit" $Y_V$, in English "Yield Point" is equal to the difference, multiplied by 2, of the values of the apparent viscosity and of the plastic viscosity, that is to say to $(V_A - V_p)2$. The "Yield Point" represents the minimum shearing stress beneath which there is no flow; this minimum shearing stress is expressed in pounds/100 square feet; it corresponds to what is called the "gel resistance", in English "gel strength".

Another important experiment is that which bears on the amount of the filtrate; it enables evaluation of the amount of liquid which will filter into the more or less permeable walls of the drill bore. It is important to know the filtration characteristics. In fact, for example high filtrates or considerable filtrates can disintegrate delicate geological formations and facilitate cavings. Moreover, the cake deposited on the walls of the drill bore can be thick to the extent of preventing the passage of the tricone bit dring tool-changing manipulations.

To determine the amount of the filtrate, recourse is had to a FANN apparatus (MUD TESTING EQUIPMENT) marketed by the Fann Instrument Corporation, Houston, Texas, or to equipment of the filter-press type marketed by the Baroid Company.

The description of the various types of equipment aforementioned inclusive that of the abovesaid rheometer can be found in the book: "Drilling Muds" of C. GARCIA and P. PARIGOT (Publication of l'Institut Francais du Pétrole, Editions Technip, 1968, pp. 61–66).

From the group of experiments illustrated by the following examples, it is concluded that the introduction of the unsalified active compound at the 1 position or at the 2 position or the introduction of the salified active compound at the 3 position not only ensure the swelling of bentonites in the presence of sea-water, but in addition provide for the fluids so-prepared not to cause swelling of clay-based geological layers traversed during drillings.

In the following examples, certain of the recorded values could seem very high and apparently inadapted to actual drilling. In fact, they are provided to illustrate the invention and they indicate rather the great effectiveness of the products according to the invention, employed according to the claimed process; in practice, it suffices to reduce the proportion of active compound and/or the concentration of clay to obtain control of the viscosity close to the desired value.

DESCRIPTION OF PREFERRED EMBODIMENTS

EXAMPLE 1

In this first example, measurements of the values of L 600 and of $Y_V$ are carried out on the one hand at time t=0, on the other hand at time t=4 days, for a certain number of viscosity control agents illustrating the invention and for each of the following cases: introduction of the agent at the 1 position, then at the 2 position and finally at the 3 position.

The clay used is a clay of the bentonite type from Wyoming; it is called clay A.

First predilution to 400 g/l in demineralized water is made, then dilution to 100 g/l in sea-water.

The results of the measurements of L 600 and of $Y_V$ for times t=0 and t=4 days are combined in table I below.

In this table, "n.c." denotes "not calculable".

The agents tried are identified by symbols from A to R denoting:

A: control (reference)
B: ethylene diamine
C: triethylene tetramine
D: N-(amino-2-ethyl)monoethanolamine
E: cyanamide
F: ethylene diamine condensed with 4 propylene oxide groups
G: dimethylamino propylamine
K: aminoguanidine hydrochloride
L: $NH_2(CH_2)_2-NH_2$, 1 HCl
M: $NH_2(CH_2)_2-NH_2$, 2 HCl
N: $NH_2[(CH_2)_2-NH]_2-(CH_2)_2-NH_2$, 2 HCl
P: $NH_2[(CH_2)_2-NH]_2-(CH_2)_2-NH_2$, 2.8 HCl
R: $NH_2[(CH_2)_2-NH]_2-(CH_2)_2-NH_2$, 3.5 HCl

TABLE I

| Agent No. | dose in % of final dispersion | 1 Position t = 0 L600 | 1 Position t = 0 $Y_V$ | 1 Position t = 4 d. L600 | 1 Position t = 4 d. $Y_V$ | 2 Position t = 0 L600 | 2 Position t = 0 $Y_V$ | 2 Position t = 4 d. L600 | 2 Position t = 4 d. $Y_V$ | 3 Position t = 0 L600 | 3 Position t = 0 $Y_V$ | 3 Position t = 4 d. L600 | 3 Position t = 4 d. $Y_V$ |
|---|---|---|---|---|---|---|---|---|---|---|---|---|---|
| A | 0 | 46 | 34 | 44 | 34 | 46 | 34 | 44 | 34 | 46 | 34 | 44 | 34 |
| B | 1 | 95 | 81 | 166 | 158 | 68 | 60 | 75 | 75 | >320 | n.c. | >320 | n.c. |
| C | 1 | >320 | n.c. | >320 | n.c. | 122 | 118 | 146 | 146 | 222 | 198 | >320 | n.c. |
| D | 1 | | | | | | | | | 228 | 114 | 255 | 231 |
| E | 1 | | | | | | | | | 54 | 40 | 63 | 51 |
| F | 1 | 28 | 18 | 22 | 14 | | | | | 138 | 134 | 104 | 104 |
| G | 1 | | | | | | | | | 166 | 118 | 150 | 134 |
|   | 0,5 | | | | | | | | | 133 | 111 | 85 | 73 |
| K | 1 | 22 | 14 | 20 | 14 | 60 | 40 | 58 | 42 | 260 | 254 | 189 | 165 |
| L | 1 | 6 | 2 | 6 | 2 | | | | | 40 | 32 | 44 | 30 |
| M | 1 | 6 | 2 | 6 | 2 | | | | | 65 | 71 | 61 | 55 |
| N | 1 | 6 | 2 | 6 | 2 | 21 | 13 | 20 | 14 | 128 | 124 | 118 | 114 |
| P | 1 | 7 | 3 | 7 | 3 | | | | | 115 | 109 | 110 | 102 |
| R | 1 | 7 | 1 | 7 | 1 | | | | | 85 | 81 | 76 | 76 |

On examining the results of measurements collected in Table I, it appears that:

unsalified agents "thicken" the fluid when they are introduced at the 1, 2 or 3 position, except as regards compound F when it is introduced in the 1 position, salified agents "fluidify" the fluid when they are introduced at the 1 position, thicken the fluid when they are introduced in the 3 position and have a variable effect when they are introduced at the 2 position.

By replacing clay A by an attapulgite (of the trademark "CLARSOL ATC") or clay C, the following values were measured:

for the control (0% of control agent):
introduction at the 1, 2 and 3 positions
- L 600 at t = 0: 103
- Y$_V$ at t = 0: 73
- L 600 at t = 4 days: 86
- Y$_V$ at t = 4 days: 62 for aminoguanidine hydrochloride (1%) as control agent:
introduction at the 1 position
- L 600 at t = 0: 40
- Y$_V$ at t = 0: 26
- L 600 at t = 4 days: 40
- Y$_V$ at t = 4 days: 24 introduction at the 2 position: experiment not carried out introduction at the 3 position
- L 600 at t = 0: 164
- Y$_V$ at t = 0: 116
- L 600 at t = 4 days: 177
- Y$_V$ at t = 4 days: 123

It results from these measurements that the salified product, also when the clay is an attapulgite, "fluidizes" the mud when it is introduced at the 1 position and "thickens" it when it is introduced at the 3 position.

The clay used was clay A.

The measurements of L 600 and Y$_V$ at t=0 and at t=4 days were carried out each time, on the one hand for the control (no agent) and, on the other hand, for concentration of 1% aminoguanidine, HCl.

The types of water used were:

Table II { predilution to 400 g/l in demineralized water / dilution to 100 g/l in demineralized water Table III { predilution to 400 g/l in sea-water / dilution to 100 g/l in sea-water Table IV { predilution to 400 g/l in city water / dilution to 100 g/l in city water Table V { predilution to 400 g/l in city water / dilution to 100 g/l in sea-water Table VI { predilution to 400 g/l in sequestered city water / dilution to 100 g/l in sequestered city water.

The results recorded were:

TABLE II

| Agent | dose in % of final disp. | 1 Position t=0 L600 | Y$_V$ | 1 Position t=4 d. L600 | Y$_V$ | 2 Position t=0 L600 | Y$_V$ | 2 Position t=4 d. L600 | Y$_V$ | 3 Position t=0 L600 | Y$_V$ | 3 Position t=4 d. L600 | Y$_V$ |
| --- | --- | --- | --- | --- | --- | --- | --- | --- | --- | --- | --- | --- | --- |
| Control | 0 | 67 | 27 | 123 | 61 | 67 | 27 | 123 | 61 | 67 | 27 | 123 | 61 |
| Amino guanidine HCl | 1 | 7 | 2 | 7 | 2 | | | | | >320 | n.c. | 203 | 161 |

It results from this table that at the 1 position the salified agents according to the invention fluidize while at the 3 position they thicken.

TABLE III

| Agent | dose in % of final disp. | 1 Position t=0 L600 | Y$_V$ | 1 Position t=4 d. L600 | Y$_V$ | 2 Position t=0 L600 | Y$_V$ | 2 Position t=4 d. L600 | Y$_V$ | 3 Position t=0 L600 | Y$_V$ | 3 Position t=4 d. L600 | Y$_V$ |
| --- | --- | --- | --- | --- | --- | --- | --- | --- | --- | --- | --- | --- | --- |
| Control | 0 | 13 | 7 | 13 | 7 | 13 | 7 | 13 | 7 | 13 | 7 | 13 | 7 |
| Amino guanidine HCl | 1 | | | | | | | | | 8 | 2 | 8 | 2 |

It results from this table that, when the predilution is carried out with sea-water and the clay is bentonite, even the salified product according to the invention, introduced at the 3 position, fluidizes instead of thickening.

TABLE IV

| Agent | dose in % of final disp. | 1 Position t=0 L600 | Y$_V$ | 1 Position t=4 d. L600 | Y$_V$ | 2 Position t=0 L600 | Y$_V$ | 2 Position t=4 d. L600 | Y$_V$ | 3 Position t=0 L600 | Y$_V$ | 3 Position t=4 d. L600 | Y$_V$ |
| --- | --- | --- | --- | --- | --- | --- | --- | --- | --- | --- | --- | --- | --- |
| Control | 0 | 34 | 10 | — | — | 34 | 10 | — | — | 34 | 10 | — | — |
| Amino guanidine HCl | 1 | | | | | | | | | 313 | 281 | 228 | 162 |

EXAMPLE 2

The influence of the nature of the water used was studied, on the one hand, for the predilution to 400 g/l and, on the other hand, for the dilution to 100 g/l.

From this table, it is concluded again that the salified products according to the invention thicken at the 3 position; the recorded result is however less high than for Table II, city water (tap water) being "harder" than demineralized water.

TABLE V

| Agent | dose in % of final disp. | 1 Position t = 0 L600 | 1 Position t = 0 Y$_V$ | 1 Position t = 4 d. L600 | 1 Position t = 4 d. Y$_V$ | 2 Position t = 0 L600 | 2 Position t = 0 Y$_V$ | 2 Position t = 4 d. L600 | 2 Position t = 4 d. Y$_V$ | 3 Position t = 0 L600 | 3 Position t = 0 Y$_V$ | 3 Position t = 4 d. L600 | 3 Position t = 4 d. Y$_V$ |
|---|---|---|---|---|---|---|---|---|---|---|---|---|---|
| Control | 0 | 34 | 24 | — | — | 34 | 24 | — | — | 34 | 24 | — | — |
| Amino guanidine HCl | 1 | | | | | | | | | 205 | 185 | 172 | 160 |

The results collected in this table illustrate well the process according to the invention. Te predilution being done with city water, the salified agents according to the invention introduced at the 3 position thicken.

It is concluded from these values that the thickening conferred by the agent according to the invention introduced in salified form at the 3 position increases with the proportion and tends to become constant when this proportion exceeds 1.2 to 1.4% in the final dispersion

TABLE VI

| Agent | dose in % of final disp. | 1 Position t = 0 L600 | 1 Position t = 0 Y$_V$ | 1 Position t = 4 d. L600 | 1 Position t = 4 d. Y$_V$ | 2 Position t = 0 L600 | 2 Position t = 0 Y$_V$ | 2 Position t = 4 d. L600 | 2 Position t = 4 d. Y$_V$ | 3 Position t = 0 L600 | 3 Position t = 0 Y$_V$ | 3 Position t = 4 d. L600 | 3 Position t = 4 d. Y$_V$ |
|---|---|---|---|---|---|---|---|---|---|---|---|---|---|
| Control | 0 | 48 | 16 | 48 | 16 | 48 | 16 | 48 | 16 | 48 | 16 | 48 | 16 |
| Amino guanidine HCl | 1 | | | | | | | | | >320 | n.c. | 250 | 182 |

The results collected in this table confirm the teachings already emplasized; they are to be compared with those of Table II.

EXAMPLE 3

This example illustrates the influence of the proportion of agent according to the invention.

The clay used was a bentonite from Wyoming different from that used in the preceding examples.

The dilution to 400 g/l was done with demineralized water and the dilution to 100 g/l with sea-water.

The measured values are the same as in the other examples.

The results are collected in Table VII.

EXAMPLE 4

This example illustrates the influence of the concentration of the predilution and that of the dilution.

The clay used was that of Example 3. Predilutions were done with demineralized and the final dilutions with sea-water.

The measurements carried out were still the same, only the addition at the 3 position having however been studied.

The results are collected in Table VIII.

TABLE VII

| Agent | Dose in % of final disp. | 1 Position t = 0 L600 | 1 Position t = 0 Y$_V$ | 1 Position t = 4 d. L600 | 1 Position t = 4 d. Y$_V$ | 2 Position t = 0 L600 | 2 Position t = 0 Y$_V$ | 2 Position t = 4 d. L600 | 2 Position t = 4 d. Y$_V$ | 3 Position t = 0 L600 | 3 Position t = 0 Y$_V$ | 3 Position t = 4 d. L600 | 3 Position t = 4 d. Y$_V$ |
|---|---|---|---|---|---|---|---|---|---|---|---|---|---|
| Control | 0 | 38 | 26 | 38 | 24 | 38 | 26 | 38 | 24 | 38 | 26 | 38 | 24 |
| Amino guanidine HCl | 0,2 | | | | | | | | | 62 | 50 | 52 | 34 |
| Amino guanidine HCl | 0,4 | | | | | | | | | 167 | 143 | 126 | 106 |
| Amino guanidine HCl | 0,8 | | | | | | | | | 274 | 242 | 208 | 178 |
| Amino guanidine HCl | 1 | | | | | | | | | 291 | 273 | 251 | 227 |
| Amino guanidine HCl | 1,2 | | | | | | | | | 286 | 268 | 252 | 230 |
| Amino guanidine HCl | 1,4 | | | | | | | | | 287 | 269 | 262 | 242 |

TABLE VIII

| Predilution and dilution Concentration | Agent | % agent final disp. | Introduction of agent at the 3 Position | | | |
|---|---|---|---|---|---|---|
| | | | t = 0 | | t = 4 d. | |
| | | | L600 | Y$_V$ | L600 | Y$_V$ |
| Predilution: 200 g/l | Control | 0 | 17 | 9 | — | — |
| Dilution: 50 g/l | Aminoguanidine HCl | 1 | 152 | 138 | 153 | 133 |
| Predilution: 300 g/l | Control | 0 | 29 | 17 | — | — |
| Dilution: 75 g/l | Aminoguanidine HCl | 1 | 274 | 260 | 225 | 217 |
| Predilution: 400 g/l | Control | 0 | 38 | 26 | 38 | 24 |
| Dilution: 100 g/l | Aminoguanidine HCl | 1 | 271 | 273 | 251 | 227 |

It results from these values that the thickening effect conferred by the agent according to the invention introduced in salified form at the 3 position is maintained when the concentration of the clay in the fluid is varied.

bentonite of Example 1. The reconstitution of the fluid by means of the filtrate and its rheology illustrate of course what happens at the level of the influence of the filtrate on a clay layer traversed by the drilling.

The recorded results are collected in Table IX.

TABLE IX

| Type of dilution | Agent | % agent final disp. | Introduction of agent at the 3 Position | | | |
|---|---|---|---|---|---|---|
| | | | t = 0 | | t = 4 d. | |
| | | | L600 | Y$_V$ | L600 | Y$_V$ |
| Predilution: 400 g/l in demineralized water | Control | 0 | 67 | 27 | 123 | 61 |
| Dilution: 100 g/l in demineralized water | Aminoguanidine HCl | 1 | >320 | n.c. | 203 | 161 |
| Predilution: 400 g/l in demineralized water | Control | 0 | 46 | 34 | 44 | 34 |
| | Aminoguanidine HCl | 1 | 260 | 254 | 189 | 165 |
| Dilution: 100 g/l in sea water | Triethylene tetramine | 1 | 222 | 198 | >320 | n.c. |
| FILTRATION: all the fluids | | | | | | |
| Dilution with 100 g/l of the same clay in the corresponding reidentified filtrates | Control | 0 | 36 | 10 | 44 | 34 |
| | Aminoguanidine HCl | 1 | 27 | 11 | 48 | 20 |
| | Control | 0 | 7 | 1 | 7 | 1 |
| | Aminoguanidine HCl | 1 | 7 | 1 | 7 | 1 |
| | Triethylene tetramine | 1 | 9 | 5 | 9 | 5 |

EXAMPLE 5

This example illustrates the influence that the fluid can have on a clay-based geological layer traversed by the drilling.

It is known that it is the "filtrate", that is to say the water, which is separated from the fluid which penetrates into the clay layer.

This filtrate must not cause the constituent clay of the layer to swell.

To carry out this demonstration, a first fluid was manufactured and the swellings or thickenings obtained were read off, the two control agents of the invention tested and compared with the standard (no control agent) being aminoguanidine hydrochloride and triethylene tetramine which were introduced at the 3 position at the proportion of 1% in the final dispersion; a first experiment was carried out by proceding with predilution to 400 g/l and subsequent dilution to 100 g/l by resorting to demineralized water, then a second experiment in which the predilution was carried out with demineralized water and the dilution with sea-water; the measurements carried out were the same as in the preceding examples.

Then the filtration of the thus obtained fluid was effected by resorting to a BAROID filter-press and the filtrate thus obtained was used to prepare a further fluid with 100 g/l, the clay used in the two steps being the It is pointed out the filtration takes a longer time in the case of fluids comprising a control agent according to the invention than in the case of the standard.

From the results collected in this table, it is clearly apparent that the fluids obtained by means of a filtrate containing a control agent according to the invention—which had however caused the fluid to swell before filtration—do not swell.

Such a mud hence prevents the clay layer traversed from swelling.

EXAMPLE 6

From this example, the influence of stirring on the rheology of the fluids is illustrated, the stirring being able to take place, as is noted, at various times in the preparation.

In the experiments carried out, the following stages are distinguished:
Stage 1: predilution to 400 g/l in demineralized water
Stage 2: dilution to 100 g/l in sea-water
Stage 3: addition of the agent if required
Stage 4: stirring after addition of the agent.

At these different stages, the fluids formed were subjected to the stirring or standing conditions collected in Table X.

Finally the same measurements were carried out as in the other examples. Results are also collected in Table X.

TABLE X

| Standing or stirring | | | Agent | % agent final disp. | t = 0 | | t = 4 d. | |
| --- | --- | --- | --- | --- | --- | --- | --- | --- |
| Stage 1 | Stage 2 | Stage 4 | | | L600 | $Y_V$ | L600 | $Y_V$ |
| Prep.: 5 min. Standing: 2 h. | Stirring at 300 t/mn over 5 min. | Control: no stirring | Control | 0 | 43 | 31 | 46 | 30 |
| | | Additive: 5 mn at 2700 t/mn | Aminoguanidine HCl | 1 | >320 | n.c. | 303 | 289 |
| Prep.: 5 min. Standing: 0 | 50 min. at 2700 t/mn | Control: no stirring | Control | 0 | 33 | 19 | 37 | 21 |
| | | Additive: 5 mn at 2700 t/mn | Aminoguanidine HCl | 1 | 305 | 285 | 272 | 252 |
| Prep: 5 min. Standing: 0 | No stirring No standing | Control: 50 mn at 2700 t/mn | Control | 0 | 33 | 19 | 37 | 21 |
| | | Additive: 50 mn at at 2700 t/mn | Aminoguanidine HCl | 1 | 197 | 167 | 192 | 156 |

On examining the results collected in this table, it is apparent that stirring at various stages effectively plays a role, but that the latter is of the "second order" with respect to the influence of the characteristic elements of the invention (agent and process characteristics).

We claim:

1. A process for preparing drilling fluids comprising bentonite type clays and sea water having a stable viscosity comprising forming a concentrated premix of bentonite and soft water, diluting the premix with sea water up to the concentration desired for the drilling fluid, and adding an effective amount, sufficient to increase and stablize the viscosity of said drilling fluid, of at least one salified or unsalified compound selected from the group consisting of cyanamide
ethylene diamine and its salts
triethylene tetramine and its salts
N-(amino-2-ethyl)monoethanolamine and its salts
ethylene diamine condensed with four propylene oxide groups and its salts
dimethylamino propylamine and its salts
the salts of aminoguanidine and guanidine the addition of unsalified compounds being in position 1 (i.e. to the soft water used for the constitution of the premix), 2 (i.e. to the premix) or 3 (i.e. to the fluid obtained by dilution of the premix with salt water) with the provisio that unsalified ethylenediamine condensed with four propylene oxide groups is only added in position 3, the addition of the salified compounds being in position 3.

2. Process according to claim 1, wherein the salt of ethylene diamine, triethylene tetramine, N-(amino-2-ethyl)monoethanolamine, ethylene diamine condensed with four propylene oxide groups, dimethylamino propylamine, aminoguanidine and guanidine is a hydrochloride.

3. Process according to claim 1, wherein the salt of ethylene diamine, triethylene tetramine, N-)amino-2-ethyl)monoethanolamine, ethylene diamine condensed with four propylene oxide groups, dimethylamino propylamine, aminoguanidine and guanidine is a salt of an inorganic or organic acid selected from the group consisting of sulfuric, sulfamic, phosphoric, formic and acetic acid.

4. Process according to claim 4, wherein the concentration of bentonite of the premix is selected in the range of about 500 to 20 g/l and the concentration of bentonite of the drilling fluid after dilution with sea water in the range of about 200 to 5 g/l.

5. Process according to claim 1, wherein the concentration of bentonite of the premix is selected in the range of about 400 to 50 g/l and the concentration of bentonite of the drilling fluid after dilution with sea water in the range of about 100 to 10 g/l.

6. Process according to claim 1 wherein the amount of compound added is such that its proportion in the drilling fluid after dilution is about 0.05 to 10% by weight.

7. Process according to claim 1, wherein the amount of compound is such that its proportion in the drilling fluid after dilution is about 0.1 to 2% by weight.

* * * * *